(12) United States Patent
Narayanaswamy et al.

(10) Patent No.: US 12,710,289 B2
(45) Date of Patent: Aug. 18, 2026

(54) RESTRICTION OF UTILITY SERVICES WITHOUT FULL SERVICE DISCONNECT

(71) Applicant: Itron, Inc., Liberty Lake, WA (US)

(72) Inventors: Gokulmuthu Narayanaswamy, Bangalore (IN); Rajeena Ponneth, Bangalore (IN); Badri Narayan Krishnan, Bengaluru (IN)

(73) Assignee: Itron, Inc., Liberty Lake, WA (US)

( * ) Notice: Subject to any disclaimer, the term of this patent is extended or adjusted under 35 U.S.C. 154(b) by 583 days.

(21) Appl. No.: 18/206,558

(22) Filed: Jun. 6, 2023

(65) Prior Publication Data

US 2024/0410719 A1 Dec. 12, 2024

(51) Int. Cl.
*G06Q 50/06* (2024.01)
*G01D 4/00* (2006.01)
*G01D 4/18* (2006.01)

(52) U.S. Cl.
CPC ............... *G01D 4/18* (2013.01); *G01D 4/002* (2013.01); *G06Q 50/06* (2013.01)

(58) Field of Classification Search
CPC .......... G01D 4/18; G01D 4/002; G06Q 50/06; H02J 2310/14; H02J 2310/60; H02J 2310/62; H02J 13/00004; H02J 3/14
See application file for complete search history.

(56) References Cited

U.S. PATENT DOCUMENTS

2002/0105435 A1 8/2002 Yee et al.
2006/0190140 A1* 8/2006 Soni .......................... H02J 3/14 700/297
2006/0190141 A1 8/2006 Patterson et al.
2007/0299562 A1* 12/2007 Kates ........................ H02J 3/14 700/295
2010/0145544 A1* 6/2010 Forbes, Jr. ............. G06Q 10/00 700/295
2013/0123998 A1* 5/2013 King ................. H02J 13/00006 700/292

(Continued)

FOREIGN PATENT DOCUMENTS

CA 269834 A 4/1927

OTHER PUBLICATIONS

Search Report for European Application No. 24180397.2, Dated Oct. 17, 2024, 8 pages.

(Continued)

*Primary Examiner* — Christopher E. Everett
(74) *Attorney, Agent, or Firm* — Lee & Hayes, P.C.

(57) ABSTRACT

Techniques are described for restricting the use of electricity at a service site that is “restricted,” such as for non-payment. A threshold value is set, indicating a maximum rate of electricity usage. The threshold value may be set based in part on an ambient temperature or to exclude the use of certain appliances, such as air conditioners. In example operation, it is determined that a consumption level at the service site exceeds the threshold value. Accordingly, electricity is turned off at the service site. After a period of time, that allows customers to turn off one or more appliances, electricity is restored to the customer’s service site, and a second consumption level is determined. It is determined if the second consumption level exceeds the second threshold level. If the second consumption level exceeds the second threshold value, then the service is again shut off.

20 Claims, 8 Drawing Sheets

(56) References Cited

U.S. PATENT DOCUMENTS

2015/0248117 A1 9/2015 Furuya et al.
2017/0089960 A1* 3/2017 Mashima .............. G01R 22/10
2019/0123580 A1 4/2019 Bindea et al.

OTHER PUBLICATIONS

Examination Report for Canadian Application No. 3,233,747, Dated Sep. 15, 2025, 5 pages.
Examination Report for Australian Application No. 2024202590, Dated Jan. 24, 2025, 5 pages.

* cited by examiner

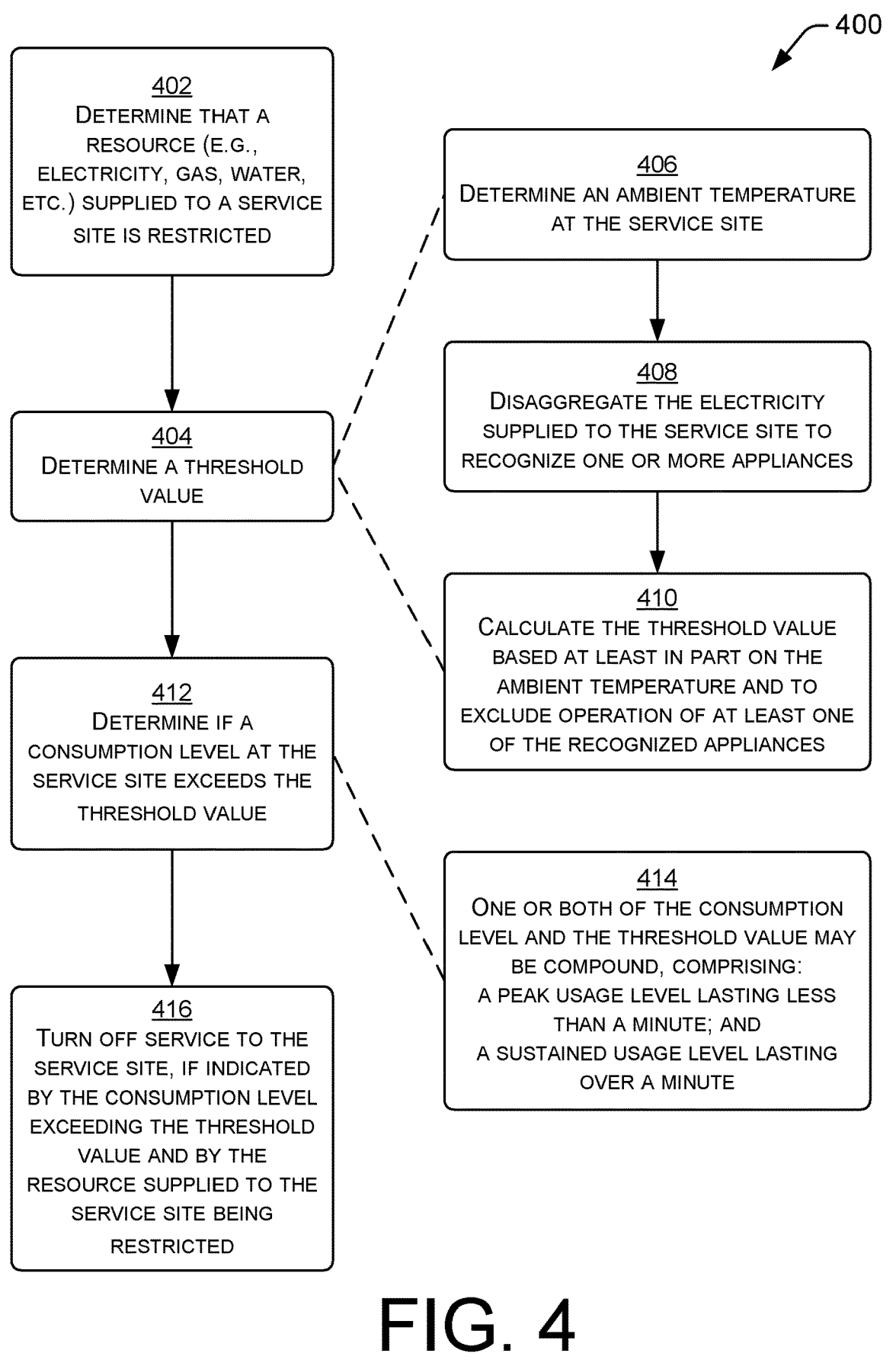

400

402
DETERMINE THAT A RESOURCE (E.G., ELECTRICITY, GAS, WATER, ETC.) SUPPLIED TO A SERVICE SITE IS RESTRICTED

404
DETERMINE A THRESHOLD VALUE

406
DETERMINE AN AMBIENT TEMPERATURE AT THE SERVICE SITE

408
DISAGGREGATE THE ELECTRICITY SUPPLIED TO THE SERVICE SITE TO RECOGNIZE ONE OR MORE APPLIANCES

410
CALCULATE THE THRESHOLD VALUE BASED AT LEAST IN PART ON THE AMBIENT TEMPERATURE AND TO EXCLUDE OPERATION OF AT LEAST ONE OF THE RECOGNIZED APPLIANCES

412
DETERMINE IF A CONSUMPTION LEVEL AT THE SERVICE SITE EXCEEDS THE THRESHOLD VALUE

414
ONE OR BOTH OF THE CONSUMPTION LEVEL AND THE THRESHOLD VALUE MAY BE COMPOUND, COMPRISING:
A PEAK USAGE LEVEL LASTING LESS THAN A MINUTE; AND
A SUSTAINED USAGE LEVEL LASTING OVER A MINUTE

416
TURN OFF SERVICE TO THE SERVICE SITE, IF INDICATED BY THE CONSUMPTION LEVEL EXCEEDING THE THRESHOLD VALUE AND BY THE RESOURCE SUPPLIED TO THE SERVICE SITE BEING RESTRICTED

FIG. 4

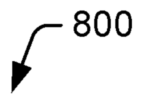
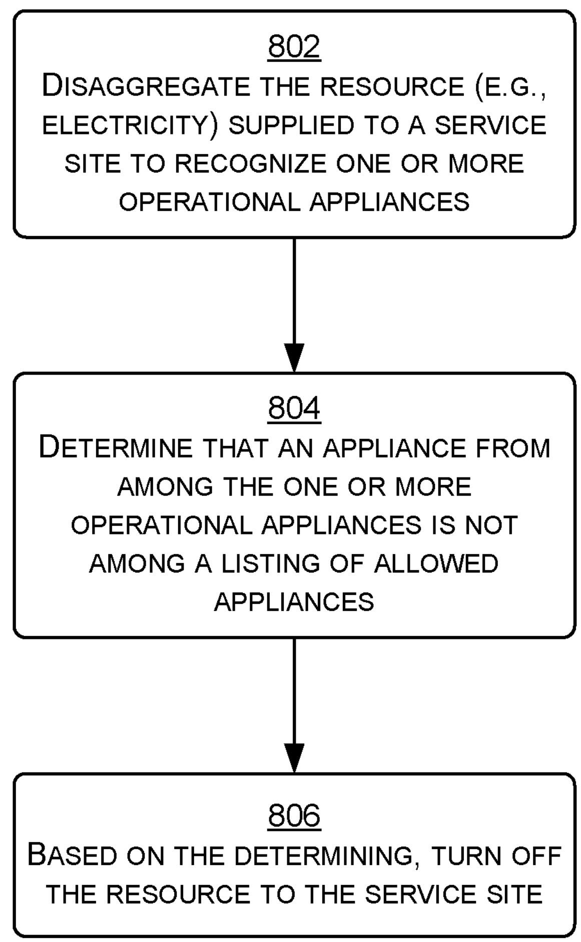
FIG. 8

RESTRICTION OF UTILITY SERVICES WITHOUT FULL SERVICE DISCONNECT

BACKGROUND

Disconnecting electrical power from a customer whose account is in arrears involves social issues, such as the hardships of the people at the service site. Until social solutions are conceived and implemented, technical innovations that lessen social hardships and result in greater economic efficiency would be welcome.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

FIG. 4 is a flow diagram showing aspects of restriction of utility services without full service disconnect, showing examples of how electrical usage by a restricted customer may be managed and/or controlled.

FIG. 8 is a flow diagram showing example use of disaggregation techniques that recognize and/or restrict utility consumption by individual appliances of a customer whose account includes a restriction of utility usage without full service disconnect.

DETAILED DESCRIPTION

Overview

Disconnecting power from a customer having non-payment issues involves social issues, such as the hardship of the people at the service site. Accordingly, techniques for restricting the use of utilities, such as electricity, gas, and water, are described herein. In an example related to electricity, it is determined that a service site has been declared to be "restricted" or "put on probation," such as for non-payment. In response, a threshold value is set, indicating a maximum rate of electricity usage. The rate of usage may be measured as power (e.g., in Watts) and/or as energy (e.g., in kilowatt hours).

In an example, the setting of the threshold value may involve determining an ambient temperature. The threshold value may be set based at least in part on the ambient temperature, and may be calculated and set to both allow survival of residents at the service site and also to result in some inconvenience for those residents. In example operation, it may be determined that a consumption level at the service site exceeds the threshold value. In response, electricity to the service may be turned off After a period of time, an update of the ambient temperature is determined. A second threshold value is calculated based at least in part on the update of the ambient temperature. The service is reconnected, and a second consumption level is determined. If it is determined that the second consumption level exceeds the second threshold level, then the service is again shut off.

In a second example, disaggregation techniques may be used to determine types of appliances (e.g., an air conditioner or a hot water tank, etc.) at use at the service site. The disaggregation techniques may be applied before and/or after the service site is restricted. In the example, the threshold value to which the consumption level is compared may be set to preclude the use of one or more of the identified appliances (e.g., room air conditioners, etc.).

Example System and Techniques

Figure 1:
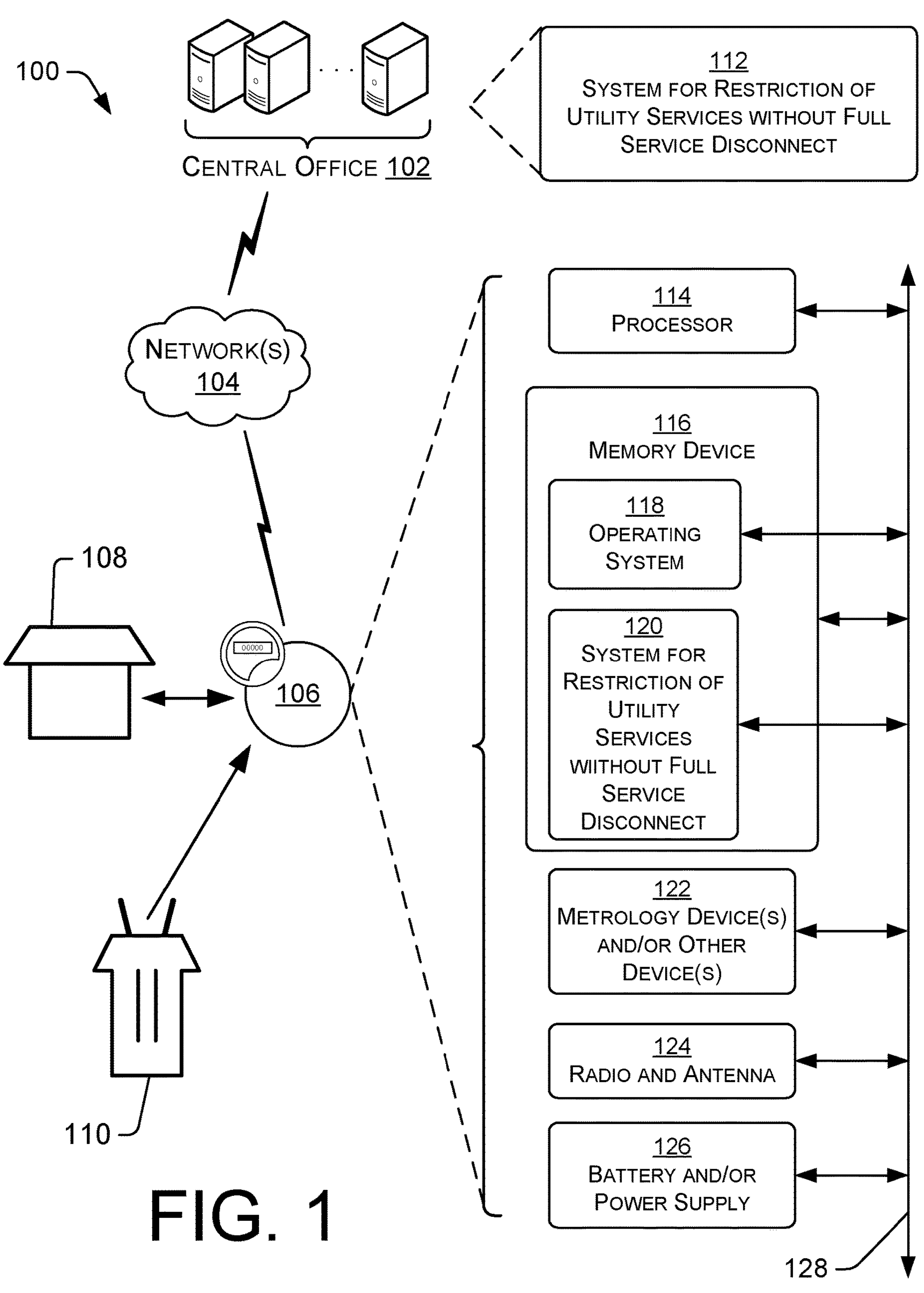
FIG. 1 is block diagram showing a portion of an example electricity grid implementing restriction of utility services without full service disconnect at the meter level, at the electricity company server level, and/or the "cloud" level.

FIG. 1 shows aspects of an example electricity grid 100 showing how restriction of utility services without a full service disconnect may be implemented either at the meter level, at the electricity company server level, and/or at the "cloud" level. The example electricity grid 100 includes central office (e.g., cloud) computers and/or servers 102 and networks 104. The networks 104 may include one or more of the internet, utility company proprietary network(s) using radio, powerline communications (PLC), mesh networks, star networks, etc.

A utility meter 106 serves a customer site 108, and is representative of many such meters and sites, which may number in the thousands or hundreds of thousands. In the example shown, the meter is a smart meter and is in communication with the central office server(s) 102 through the network 104. A transformer 110 is configured to serve one or more customers, and provides low voltage service to the meter 106. The transformer 110 is representative of many such transformers, which may number in the thousands or hundreds of thousands.

A system for restriction of utility services without a full service disconnect may be located on the central office server 102, or on the smart utility meter 106. For purposes of illustration, FIG. 1 shows both examples, wherein the system 112 is located on the central office server 102, and wherein the system 120 is located on the smart utility meter 106. In some examples, the system 112 may include some of the functionality of an overall system, while the system 120 may include the remainder of the functionality. In an example, portions of the system operational on the servers 102 may calculate the threshold values to be used, while portions of the system operational on the utility meter may perform comparisons between electricity usage and the threshold values.

In the example shown, the smart utility meter 106 includes a processor 114 and memory device 116. The memory device 116 may include software programs, that when executed by the processor 114, perform useful functions. In the example of FIG. 1, two software applications are shown, including an operating system 118 and the system 120 for restriction of utility services without a full service disconnect.

The smart meter 106 may include metrology device(s) 122, which may measure consumption of a commodity, such as electricity, natural gas, or water. The examples discussed here describe systems 112 and 120 that are directed to electricity. However, corresponding systems could be constructed for use with other resources (e.g., natural gas, water, etc). Accordingly, the techniques described herein—while they may be explained from the perspective and terminology of electricity—are applicable to any measured commodity.

The smart meter 106 may include a radio and antenna 124. Alternatively, the smart meter may include a PLC modem or other communications device. The smart meter 106 may also include a battery and/or a power supply 126. In the example of a system configured as an electricity grid, a battery is not required. A power supply is configured to provide regulated direct current (DC) power at prescribed voltage levels for operation of the processor 114, the memory device 116, the radio 124, and/or other devices. A bus, printed circuit board, wiring harness, and/or other circuit connectivity device(s) 128 may be used to connect the processor 114, the memory device 116, the metrology devices 122, the radio 124, and the power supply 126.

Figure 2:
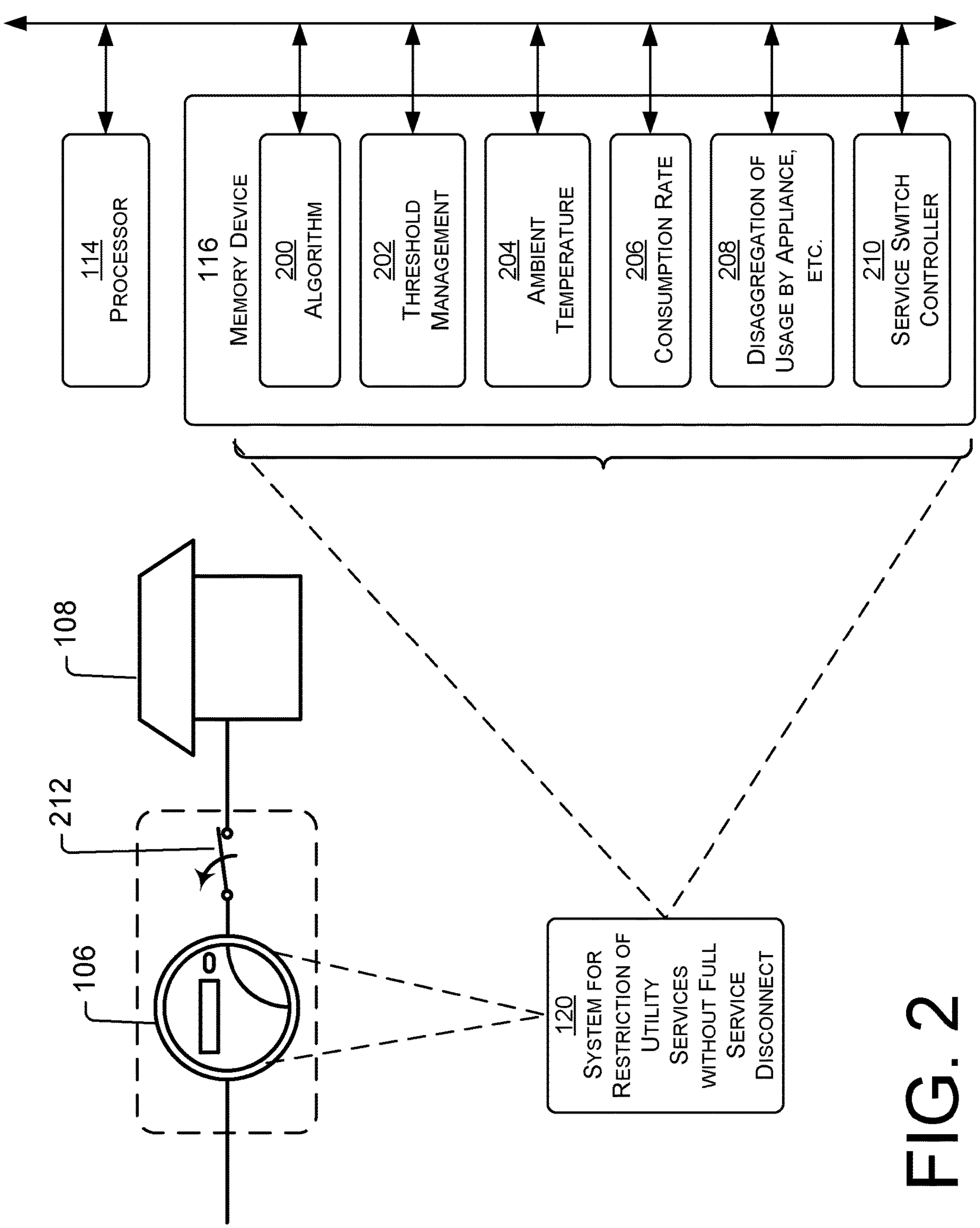
FIG. 2 is block diagram showing a portion of an electricity grid wherein restriction of utility services without full service disconnect is implemented by an example computing device.

FIG. 2 shows aspects of an example computing device (e.g., the smart metering device 106) and system 120 for restriction of utility services without a full service disconnect. The example computing device and system 120 is part of a smart metering device 106 configured to measure utility use by a service site 108 (e.g., a home or business, etc.). While FIG. 2 shows example components and techniques using system 120 as an example, the description of FIG. 2 also applies to system 112. Further components and techniques described in FIG. 2 could be distributed between system 112 and system 120, thereby locating some of the functionality on each of the systems.

The processor 114 may access data including executable programming instructions located in the memory device 116. Examples of an algorithm 200 are described in FIGS. 4 through 8. The algorithm 200 may be defined in hardware and/or software, and may be located on the meter 106, the central office server 102, or distributed with parts of the software in each of those locations. In operation, execution of software configured to implement the algorithm restricts utility services to customers who are in arrears without fully disconnecting their respective utility services. Instead of a full disconnect, intermittent disconnections are performed when the service site's consumption rate exceeds a threshold value. Thus, the algorithm 200 may connect and disconnect a utility service, based on inputs including one or more of: timing (e.g., time of day and/or time period lengths); utility commodity consumption rate(s); ambient temperature; and/or use to which the utility commodity (e.g., electricity) is put, etc. In example operation, the algorithm may call or invoke subroutines or portions of its own code to manage threshold values, determine ambient temperature, determine utility consumption rate(s), disaggregate utility consumption, etc.

The algorithm 200 may utilize a threshold management subroutine 202 or equivalent software statements and/or structures. One or more thresholds may be set based on one or more factors. In an example, a consumption rate limit threshold may be a maximum rate of electricity consumption that is allowed. Consumption over the consumption rate limit threshold would result in service disconnection. A second example threshold may be a surge rate limit threshold. In some examples, motors, compressors, and appliances initially consume more electricity than they do in a steady state of operation. Consumption over the surge rate limit threshold may result in service disconnection.

The algorithm 200 may utilize an ambient temperature subroutine 204 or equivalent software statements and/or structures. The ambient temperature subroutine 204 may be used to provide temperature readings to other parts of the algorithm 200. In a first example, a temperature variable may be refreshed at intervals with a temperature value. In a second example, a temperature value may be made available to the threshold management subroutine 202, such as by a digital thermometer, the internet, or other information source.

The algorithm 200 may utilize a consumption rate subroutine 206 or equivalent software statements and/or structures. The consumption rate subroutine 206 may receive information from the metrology device(s) 122. The consumption rate subroutine 206 may receive consumption information and calculate instantaneous and/or smoothed average consumption rates or consumption values. The consumption values may be compared to threshold values by the algorithm 200 to determine if the consumption values exceed the threshold value(s), thereby indicating that power should be turned off at the service site.

The algorithm 200 may utilize a disaggregation subroutine 208 or equivalent software statements and/or structures. The disaggregation subroutine 208 is configured to "disaggregate" electrical usage to determine which appliances are operating and which are not. By looking at the total electrical consumption rate (e.g., Watts) and the consumption rate of individual appliances (e.g., space heaters, stove tops, etc.) the identity of the operational appliances may be determined. Thus, the sum of the usage of the operating appliances equals the current consumption rate. Identifying appliances assists in determining if the restricted customer is operating disallowed appliances (e.g., air conditioning) that are large energy consumers.

The algorithm 200 may utilize a service switch controller 210 or driver routine. The service switch controller 210 is configured to turn electricity on or off at the service site, such as by sending a signal to a switch 212 that is typically located within the electricity meter. The dashed line about the electricity meter 106 and switch 212 indicates that the switch may be internal or external to the electricity meter.

The algorithm 200 may consider if electricity is readily available or in short supply within the electricity grid 100. In a first example, if power is readily available, then thresholds may be set to allow customers whose bills are in arears to use somewhat more electricity than would otherwise be allowed. Thus, if power is readily available, a higher threshold would allow greater power usage before the customer is cut off. In a contrasting second example, when power is in short supply a lower threshold would cut off the customer's service for consuming electricity at a rate that would have been allowed if power was in greater supply.

Example Timing Techniques

Figure 3:
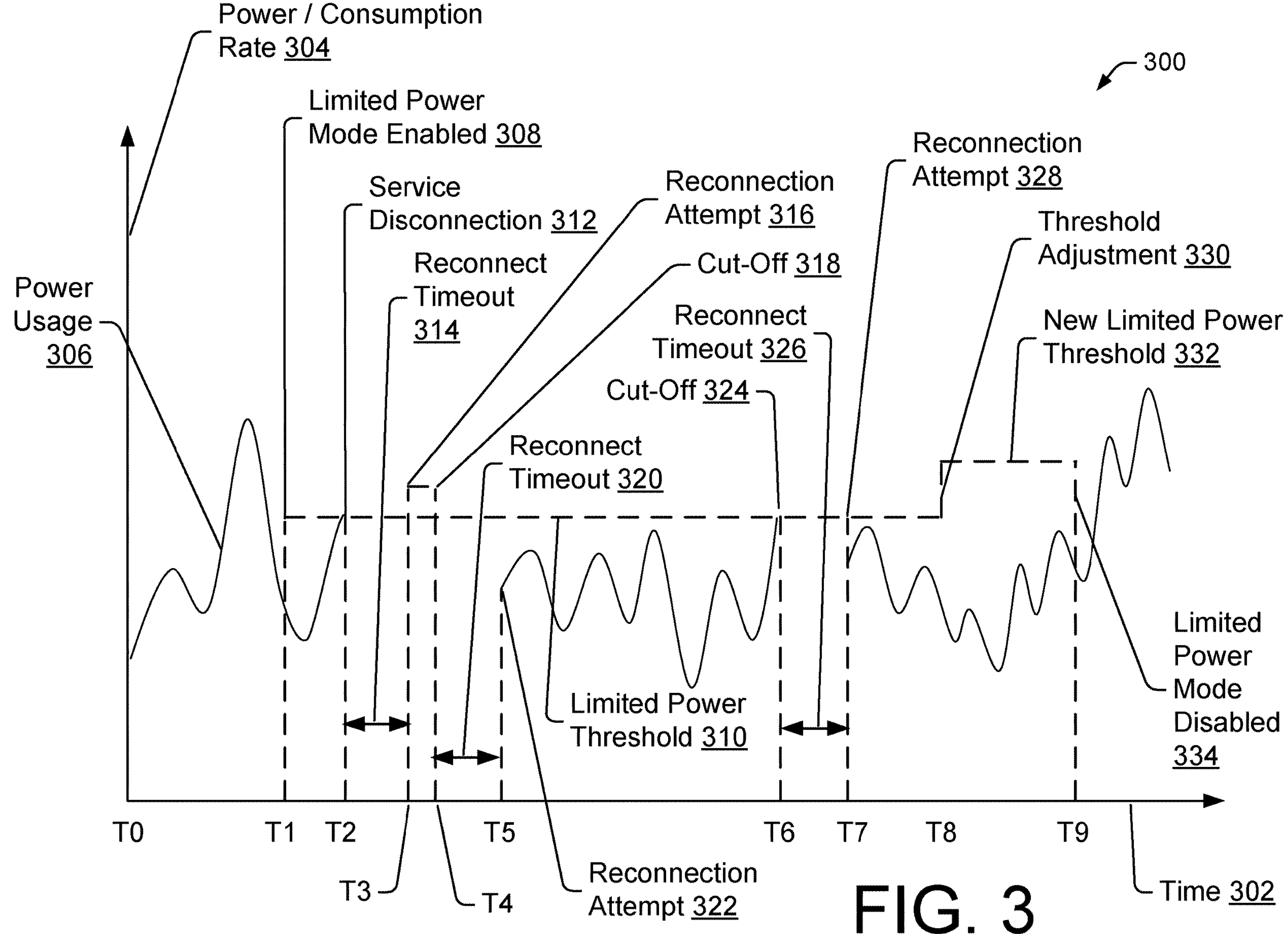
FIG. 3 is a timing diagram showing techniques for restricting utility services without a full service disconnect, wherein the techniques may be implemented either at the smart meter level or at the electricity company server (e.g., "the cloud") level.

FIG. 3 is a timing diagram 300 showing techniques for restricting utility services without a full service disconnect, which may be implemented either at the meter level or at the electricity company server (e.g., "the cloud") level. Time 302 is shown on the horizontal axis, while the vertical axis shows power usage 304 and/or a rate of electricity consumption. The power usage 306 of a service site is shown by the variable (i.e., curving) line, indicating changes in the consumption rate over time.

At time T0, the service site is consuming electricity at a level indicated by the graph. However, at time T1 a limited power mode 308 is enabled. The limited power mode may be enabled by the utility company due to non-payment for the utility service. The limited power mode 308 is associated with a limited power threshold 310, which limits the rate of electrical consumption to a fixed or threshold value, such as 100 Watts, 1000 Watts, or other value. The limited rate of electrical consumption allows residents at the service site to utilize limited amounts of electricity for priority needs, such as cellphone charging, etc. Between times T1 and T2 the service site stays under the limited power threshold 310.

However, at time T2 the rate of electricity use exceeds the limited power threshold 310, thereby resulting in a first service disconnection 312 or service "cut-off." Accordingly, the service remains disconnected for a reconnection timeout period 314 (between T2 and T3) and electricity is not consumed. The reconnection timeout period allows the residents at the service site to turn off electricity-consuming devices (which are not operating, due to the disconnection).

At time T3, i.e., following the timeout period 314, a reconnection attempt 316 is performed. The reconnection attempt may be initiated automatically by the algorithm 200 or may be initiated by the residents at the service site. In the example of FIG. 3, the reconnection attempt 316 fails because the service site draws more current than the limited power threshold 310. This may indicate that the people at the service site did not turn off appliances during the timeout period 314. The power used by the service site may be measured after any surge currents have ended, i.e., a short time after T3. Due to the power demand exceeding the limited power threshold 310, at T4 a second service disconnection 318 or cut-off is performed. The time period between T3 and T4 may be based at least in part on an expectation that a "surge current" may exceed the limited power threshold 310 for a short period of time, but then subside. If by time T4 the service site consumption rate is still greater than the limited power threshold 310, the service disconnection (i.e., the cut-off) 318 is performed.

However, at time T5 (after the reconnection timeout period 320) a further reconnection attempt 322 is performed. This time the service site consumption rate is below the limited power threshold 310, and service at the service site is restored in the limited power mode. However, at time T6 the service site consumption rate again exceeds the limited power threshold 310, and there is a further service disconnection 324. After expiration of the reconnect timeout period 326 the reconnection attempt 328 is successful, and service at the service site is resumed.

At time T8, a threshold adjustment 330 changes or resets the threshold variable and the new limited power threshold 332 replaces the original limited power threshold 310. The threshold adjustment 330 may be in response to a change in the ambient temperature, and may provide additional electricity to the service site for space heating, electric blankets, etc. While the adjustment 330 is shown to be positive, it may alternatively be negative.

At time T9, the limited power mode is disabled 334. Accordingly, the service site is no longer restricted by a threshold. Instead, the service site is limited only by the circuit breaker box size, transformer size, wiring size, etc. The limited power mode may be cancelled, for example, by payment of the energy bill.

The reconnection timeout periods 314, 320, 326 may all be of the same duration, or of different durations. In a first example, the reconnection timeout periods may be brief They may be set to provide time for the residents of the service site to turn off a high-Wattage appliance(s) to prevent a further service disconnection. In a second example, the reconnection timeout periods may become progressively longer and more punitive in nature, and serve as a reminder to restrict electricity demand to less than the limited power threshold.

Example Methods

In some examples of the techniques discusses herein, the methods of operation may be performed by one or more application specific integrated circuits (ASIC) or may be performed by a general-purpose processor utilizing software defined in computer readable media. In the examples and techniques discussed herein, the memory device 122 may comprise computer-readable media and may take the form of volatile memory, such as random-access memory (RAM) and/or non-volatile memory, such as read only memory (ROM) or flash RAM. Computer-readable media devices include volatile and non-volatile, removable, and non-removable media implemented in any method or technology for storage of information such as computer-readable instructions, data structures, program modules, or other data for execution by one or more processors of a computing device. Examples of computer-readable media include, but are not limited to, phase change memory (PRAM), programmable read-only memory (PROM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media includes non-transitory media, and does not include transitory media, such as modulated data signals and carrier waves, and/or other information-containing signals.

FIG. 4 shows a method 400 for restriction of utility services without a full service disconnect. In an example, a service site (e.g., a residence or a business) has a metering device (e.g., an electricity, gas, or water meter). In the example, a rate at which a commodity or resource (e.g., electricity) is supplied to the service site is restricted (e.g., for non-payment). A threshold value is set as an upper limit to the amount of electricity that the service site is allowed. Electricity supplied to the service site may be turned off if the consumption of the electricity exceeds the threshold. Reconnection attempts may be made based on change(s) in circumstances (e.g., passage of time and/or change in temperature, etc.). If the service site resumes use of electricity at a rate below the threshold, then service continues. If not, the service to the site may be turned off again. The threshold value against which consumption is compared may be a fixed number of Watts. Alternatively, the threshold may be more complex, and may include a higher initial "surge" value, followed by a lower "steady state" value.

At block 402, it is determined that a resource (e.g., electricity) supplied to a service site is restricted. In an example, the restriction may be indicated by a "flag" or variable setting in software of a smart meter at the service site. Additionally or alternatively, the restriction may be prompted by, and/or indicated by, software at a remote server, such as at the office of a utility company. The restriction may be set or initiated at the server, and then entered as a setting, configuration, mode, and/or state at the utility smart metering device at the service site.

At block 404, a threshold value for a rate of commodity consumption is determined. In a first example, the threshold value may be set in Watts (e.g., a 50-, 1000-, or 2000-Watt threshold). In a second example, the threshold may be set in Watt-hours. In this case, Watt-hours over a time period would be measured and compared to the threshold value. The time period may be 1-, 5-, or 60-minutes, or other threshold period of time as indicated by conditions, strategy, circumstances, etc.

Blocks 406-410 describe how in an example the threshold value may be determined. In the example, the threshold value is determined based on a calculation involving: the ambient temperature and/or a disaggregation of the electrical use at the service site showing appliances being used at the service site. The threshold value may be calculated to be high enough to protect the customers based on the ambient temperature, while being low enough to exclude operation of one or more appliances.

At block 406, an ambient temperature is determined at the service site. The ambient temperature may be considered when setting the threshold value to limit the discomfort of the residents of the service site.

At block 408, the identity or type of appliances used at the service site is determined, such as by load disaggregation techniques. The identified appliances may include any at least partially electrically-operated device, such as an air conditioner, space heaters, a hot water tank, a clothes washer, a clothes dryer, lighting, cellphone chargers, etc. The identity of the appliances may be used to set a threshold value that allows use of one or more specific appliances (e.g., smart phones and lighting), while restricting and/or preventing use of one or more other specific appliances (e.g., air conditioning).

At block 410, the threshold value is calculated based at least in part on the ambient temperature and to exclude operation of at least one of the recognized appliances.

At block 412, it is determined if a consumption level at the service site exceeds the threshold value. In the example of electricity, the consumption level may be determined by the electricity meter at the service site, and may be measured instantaneously in Watts, or over a period of time in Watt-hours.

In the example of block 414, the consumption level and/or the threshold value may be compound, i.e., including two or more values related to two or more respective concepts. In the example, the consumption value and/or the threshold value may include a peak usage level lasting less than a minute, and typically only seconds. This may be considered to be a "surge" value, and may be associated with appliances like air conditioning that requires more power in the initial seconds of operation. The consumption value and/or the threshold value may include a sustained consumption level lasting over a minute. After the surge in current upon start-up, the sustained consumption level may be a level or consistent power usage. The two consumption levels (surge and sustained) may be compared to two respective threshold values. That is, the "surge" consumption level may be compared to the "surge" threshold value, and the "sustained" consumption level may be compared to the "sustained" threshold value. This allows a selectable method to turned off service at block 416. That is, exceeding the surge threshold alone may be enough to turn off service. Alternatively, exceeding the sustained threshold alone may be enough to turn off service. And further, exceeding both thresholds may be required to turn off service.

At block 416, if the consumption level was determined to exceed the threshold value, then the service site having a restricted service is turned off Referring to the example of FIG. 3, the service disconnection 312 results when the service usage exceeds the limited power threshold 310. Referring to the example of FIG. 2, the service switch controller 210 may open the switch 212, thereby turning off electricity to the service site 108.

Figure 5:
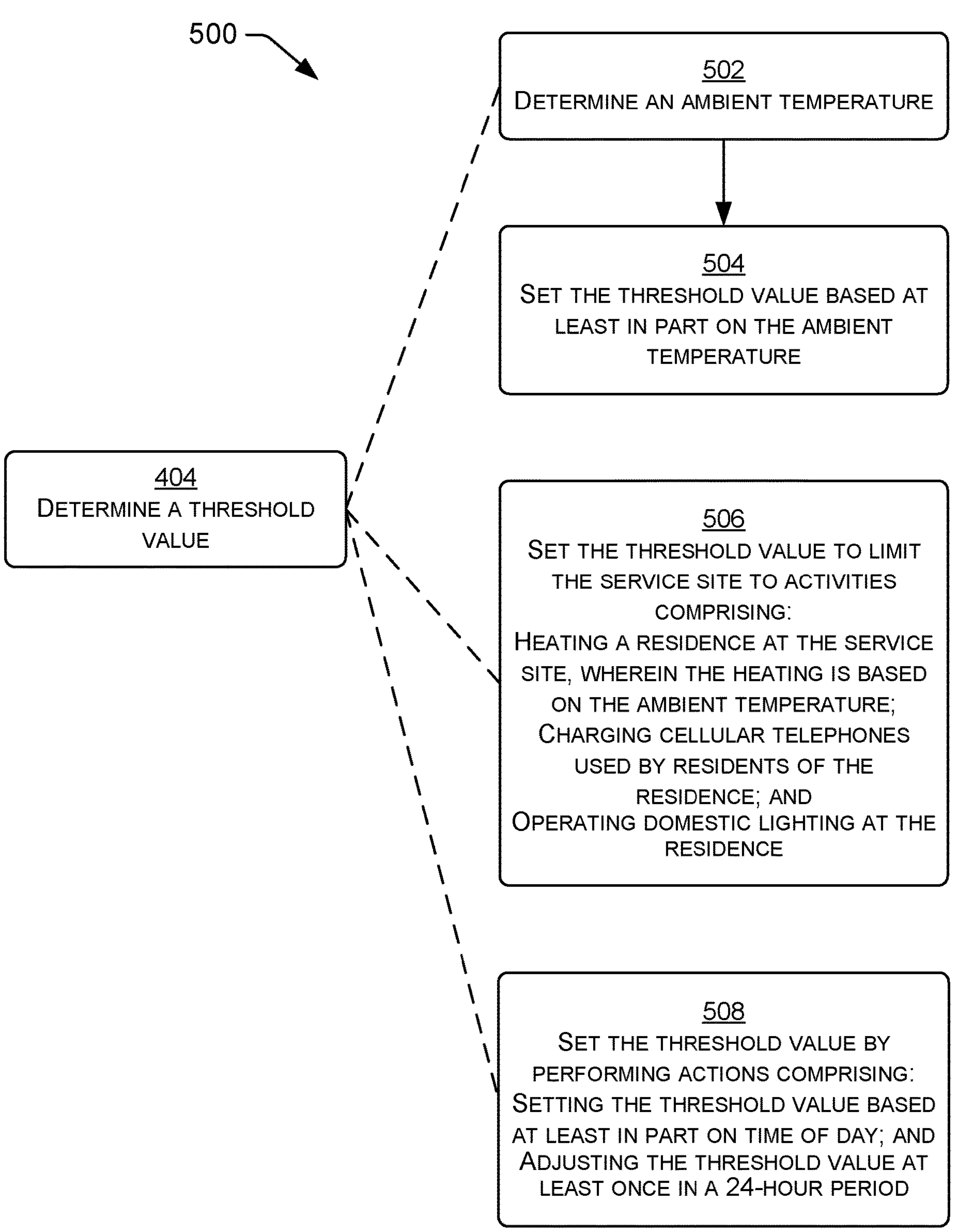
FIG. 5 is a flow diagram showing examples of how electricity usage thresholds imposed on a restricted customer may be selected and/or managed.

FIG. 5 shows examples 500 of how a threshold value is selected to serve as a maximum consumption rate. Accordingly, FIG. 5 provides a number of methods that alternatively and/or in combination may be used to implement aspects of block 404. The methods include setting a threshold value that may be compared against actual utility consumption at a service site to determine if service should be shut off at the service site.

At block 502, an ambient temperature is determined at the service site. If the electricity meter at the service site has a thermometer the temperature may be determined at the service site. In other implementation(s), a metropolitan-wide temperature may be utilized as the ambient temperature at the service site.

At block 504, the threshold value is set based in part on the ambient temperature. In an example, in extremely hot weather, the threshold value may be set to allow the use of one or more fans, but not air conditioning. In extremely cold weather, the threshold value may be set to allow operation of some heating devices, but less than historical use at that temperature. Accordingly, the threshold value may be set based at least in part on historical usage, such as a fraction of typical bills paid by the consumer. The threshold value may be set lower than historical usage to provide a motivation to pay the outstanding balance of the account. However, the threshold may be set high enough to prevent undue hardship.

At block 506, the threshold value may be set to provide a limiting rate of utility consumption at the service site to allow only selected activities. The activities may be determined by disaggregation techniques, wherein individual uses are determined from a total usage value. The allowed activities may be limited to: heating a residence at the service site, wherein the power allotted to heating is based on the ambient temperature; charging cellular telephones used by residents of the residence; and operating domestic lighting at the residence.

At block 508, the threshold value may additionally be set based at least in part on time of day. In some examples, the threshold value may be adjusted at least once in a 24-hour period. By setting the threshold value based on time-of-day allowances made in setting the threshold (such as the need to charge cellular devices at night or the need to have lighting during the evening) may be fine-tuned. Additionally or alternatively, the threshold may be set based at least in part on historical usages for different times-of-day. The threshold may be set lower than historical usage, so that the consumer is forced to reduce consumption while the account is "restricted." In additional examples, the threshold value may be set based on time of day. Thus, a higher threshold may be set for use during historically off-peak times, and a lower threshold may be set for use during historically peak periods of demand for electricity. By setting the threshold based at least in part on time of day, the customer may better understand when more electricity use is allowed (and the reverse). In an alternative, the threshold may be set based on electricity availability on the grid (e.g., with a higher threshold when more electricity if available).

Figure 6:
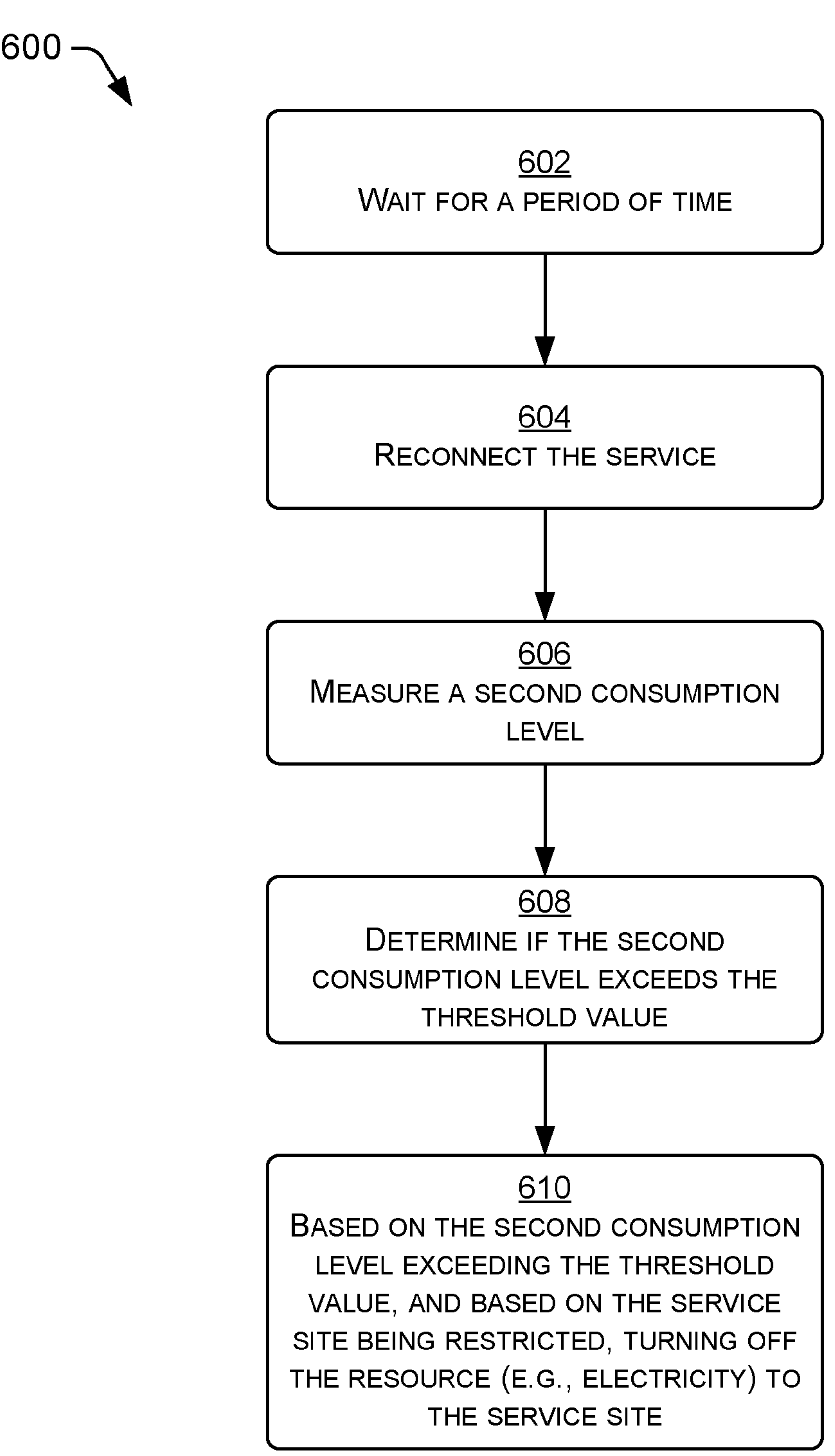
FIG. 6 is a flow diagram showing techniques that provide opportunities for the customer to have limited services reconnected after a disconnect caused by the customer's usage rate exceeding the threshold value.

FIG. 6 shows techniques 600 that provide opportunities for the customer to have limited services reconnected after a disconnect caused by the customer's usage rate exceeding the threshold value. In an example, when a customer's usage rate exceeds a threshold, the limited service (i.e., the electricity) is disconnected. After a period of time, the limited service is restored, and the usage rate is again compared to the threshold. The limited service may be turned off or continued, depending on the result of the comparison.

The techniques 600 show actions following the limited service being turned off due to a first consumption level exceeding the threshold value. The actions may allow the customer to reestablish the limited service. At block 602, a period of time is allowed to pass. Referring to FIG. 3, the period of time is similar to reconnect timeouts 314, 320, 326. At block 604, upon conclusion of the period of time, the service is reconnected. Referring to FIG. 3, service is reconnected at times T3, T5, and T7. At block 606, a second consumption level is measured. Referring to FIG. 3, a consumption level is measured at (and immediately following) T3. At block 608, it is determined if the second consumption level exceeds the threshold value. Referring to FIG. 3, the consumption level exceeded the threshold at T4, resulting in cutoff 318. At block 610, based on the service site being restricted and based on the second consumption level exceeding the threshold value, the limited utility service is turned off at the service site (e.g., electricity is turned off at the service site).

Figure 7:
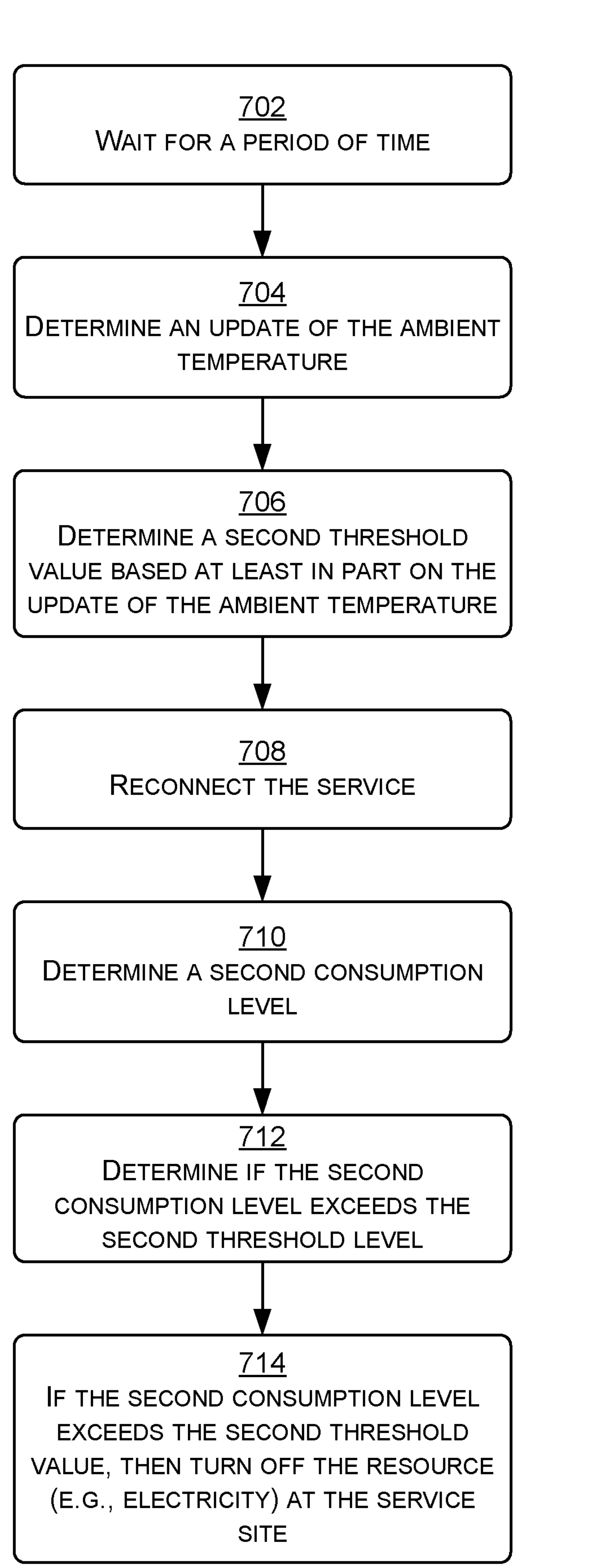
FIG. 7 is a flow diagram showing techniques for revising a threshold used to limit a usage rate of a customer whose account includes a restriction of utility usage without full service disconnect.

FIG. 7 shows techniques 700 for revising a threshold used to limit a usage rate of a customer whose account includes a restriction of utility usage without full service disconnect. Referring to FIG. 3, the threshold 310 was replaced by the threshold 332 by operation of the threshold adjustment 330. The threshold may be increased or decreased. At block 702, a period of time is allowed to pass. Referring to FIG. 3, the period of time is similar to reconnect timeouts 314, 320, 326. At block 704, an update of the ambient temperature is determined. At block 706, a second threshold value based at least in part on the update of the ambient temperature. At block 708, the limited service is reconnected. At block 710, upon reconnection a second consumption level is determined. At block 712, it is determined whether the second consumption level exceeds the second threshold level. At block 714, if the second consumption level exceeds the second threshold value, then the limited service is turned off at the service site (i.e., electricity is turned off at the service site).

FIG. 8 shows example use of disaggregation techniques 800 that recognize utility consumption by individual appliances of a customer whose account includes a restriction of utility usage without full service disconnect. The disaggregation techniques may be utilized two or more times, so that most or all of the appliances at the service site will be operational during one or more disaggregation operations. At block 802, the electricity supplied to a service site may be disaggregated to recognize one or more operational appliances. At block 804, it is determined that an appliance from among the one or more appliances discovered by the disaggregation is not among a listing of allowed appliances. For example, an air conditioner and a refrigerator may be identified by the disaggregation. The use of air conditioning may not be allowed by the restriction of utility services without full service disconnect. However, the use of the refrigerator may be allowed. At block 806, based on the determination that the non-allowable air conditioner was operating, the resource (e.g., electricity) to the service site is turned off Example Systems and Devices In some examples, the restriction of utility services without a complete service disconnection may involve limitations on the amount of customers (e.g., electricity customers) whose accounts are in arrears may use. The limitations on such restricted service sites may be based on criteria such as: the instantaneous power used by the restricted service site; the energy consumed per hour at the service site; the usage of certain appliances; the type of load (e.g., load disaggregation may identify loads or appliances whose use is restricted); the load currently on the electricity grid supplying the service site; and/or the ambient temperature or the weather, etc. The weather or temperature may be considered when setting a threshold value used to limit usage by restricted service sites to protect the customers from extreme weather, but not necessarily from uncomfortable weather. In an example, the use of small electric heaters in cold weather and fans in hot weather may be allowed. However, the use of air conditioning in hot weather may be prevented.

If the power drawn violates the criteria or limiting threshold value (e.g., a Wattage limit) that has been set, the power can be cut off using the disconnect switch within the smart meter. Power can be turned on again after a time period. The time period may be set to allow the customer to turn off appliances that caused the violation. The restricted service will allow usage of basic facilities intermittently. In an example, the restricted service ensures survival of the customer, but results in inconvenience. This can be implemented in firmware or software on a smart electricity meter, within an application (e.g., a distributed intelligence agent), or by a server in the cloud.

The following examples of restriction of utility service without a full service disconnect are expressed as numbered clauses. While the examples illustrate a number of possible configurations and techniques, they are not meant to be an exhaustive listing of the systems, methods, and/or techniques described herein.

1. A method, comprising: determining that electricity supplied to a service site is restricted; determining a threshold value, wherein determining the threshold value comprises: obtaining an ambient temperature at the service site; and basing the threshold value at least in part on the ambient temperature; determining if a consumption level at the service site exceeds the threshold value; and based on the consumption level exceeding the threshold value, and based on the electricity supplied to the service site being restricted, turning off electricity at the service site.
2. The method of clause 1, wherein determining the threshold value additionally comprises: disaggregating the electricity supplied to the service site to recognize one or more appliances; and calculating the threshold value based at least in part on the ambient temperature and to exclude operation of at least one recognized appliance.
3. The method of clause 1, wherein turning off electricity at the service site is additionally based on actions comprising: disaggregating the electricity supplied to the service site to recognize one or more appliances; determining that an appliance from among the one or more appliances is not included in a listing of allowed appliances; and based on the determining, turning off electricity at the service site.

4. The method of clause 1, additionally comprising: waiting for a period of time; reconnecting electricity to the service site; measuring a second consumption level; determining if the second consumption level exceeds the threshold value; and if the second consumption level exceeds the threshold value, then turning off electricity at the service site.
5. The method of clause 1, additionally comprising: waiting for a period of time; determining an update of the ambient temperature; determining a second threshold value based at least in part on the update of the ambient temperature; reconnecting electricity to the service site; determining a second consumption level; determining if the second consumption level exceeds the second threshold value; and if the second consumption level exceeds the second threshold value, then turning off electricity at the service site.
6. The method of clause 1, wherein: the consumption level comprises: a peak consumption level lasting less than a minute; and a sustained consumption level lasting over a minute; and the threshold value comprises: a first value to be compared to the peak consumption level; and a second value to be compared to the sustained consumption level.
7. The method of clause 1, wherein setting the threshold value additionally comprises: setting the threshold value based at least in part on time of day; and adjusting the threshold value at least once in a 24-hour period.

The method of clause 1, additionally comprising one or more or all of the above clauses.

8. A network device for use in an electricity system, comprising: a processor; one or more memory devices in communication with the processor; statements defined in the one or more memory devices and executable by the processor, wherein execution by the processor to perform actions comprising: determining that electricity supplied to a service site is restricted; determining a threshold value, wherein determining the threshold value comprises: obtaining an ambient temperature at the service site; and basing the threshold value at least in part on the ambient temperature; determining if a consumption level at the service site exceeds the threshold value; and based on the consumption level exceeding the threshold value, and based on the electricity supplied to the service site being restricted, turning off electricity at the service site.
9. The network device of clause 8, wherein determining the threshold value additionally comprises: disaggregating the electricity supplied to the service site to recognize one or more appliances; and calculating the threshold value based at least in part on the ambient temperature and to exclude operation of at least one recognized appliance.
10. The network device as recited in clause 8, wherein turning off electricity at the service site is additionally based on actions comprising: disaggregating the electricity supplied to the service site to recognize one or more appliances; determining that an appliance from among the one or more appliances is not among a listing of allowed appliances; and based on the determining, turning off electricity at the service site.
11. The network device as recited in clause 8, wherein the networked device comprises: an electricity meter; or a headend device.
12. The network device as recited in clause 8, wherein the actions additionally comprise: waiting for a period of time; reconnecting electricity to the service site; measuring a second consumption level; determining if the second consumption level exceeds the threshold value; and based on the second consumption level exceeding the threshold value, turning off electricity at the service site.
13. The network device as recited in clause 8, wherein the actions additionally comprise: waiting for a period of time; determining an update of the ambient temperature; determining a second threshold value based at least in part on the update of the ambient temperature; reconnecting electricity to the service site; determining a second consumption level; determining if the second consumption level exceeds the second threshold value; and if the second consumption level exceeds the second threshold value, then turning off electricity at the service site.
14. The network device as recited in clause 8, wherein the consumption level and the threshold value are each based at least in part on factors comprising: a sustained consumption level; and a peak consumption level.
15. The network device as recited in clause 8, wherein setting the threshold value additionally comprises: setting the threshold value based at least in part on time of day; and adjusting the threshold value at least once in a 24-hour period.

The network device of clause 8, additionally comprising one or more or all of the above clauses.

16. One or more non-transitory computer-readable media storing computer-executable instructions that, when executed by one or more processors, configure a computing device to perform actions comprising: determining that electricity supplied to a service site is restricted; determining a threshold value, wherein determining the threshold value comprises: obtaining an ambient temperature at the service site; and basing the threshold value at least in part on the ambient temperature; determining if a consumption level at the service site exceeds the threshold value; and based on the consumption level exceeding the threshold value, and based on the electricity supplied to the service site being restricted, turning off electricity at the service site.
17. One or more computer-readable media as recited in clause 16, wherein determining the threshold value additionally comprises: disaggregating the electricity supplied to the service site to recognize one or more appliances; and calculating the threshold value based at least in part on the ambient temperature and to exclude operation of at least one recognized appliance.
18. One or more computer-readable media as recited in clause 16, additionally comprising: waiting for a period of time; reconnecting electricity to the service site; measuring a second consumption level; determining if the second consumption level exceeds the threshold value; based on the second consumption level exceeding the threshold value, turning off electricity at the service site.
19. One or more computer-readable media as recited in clause 16, additionally comprising: waiting for a period of time; determining an update of the ambient temperature; determining a second threshold value based at least in part on the update of the ambient temperature; reconnecting electricity to the service site; determining a second consumption level; determining if the second consumption level exceeds the second threshold value;

and if the second consumption level exceeds the second threshold value, then turning off electricity at the service site.

20. One or more computer-readable media as recited in clause 16, wherein setting the threshold value additionally comprises setting the threshold value to include only electrical loads for uses comprising: heating a residence at the service site, wherein the heating is based on the ambient temperature; charging cellular telephones used by residents of the residence; and operating domestic lighting at the residence.

The one or more computer-readable media as recited in clause 16, additionally comprising one or more or all of the above clauses.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The words comprise, comprises, and/or comprising, when used in this specification and/or claims specify the presence of stated features, devices, techniques, and/or components. The words do not preclude the presence or addition of one or more other features, devices, techniques, and/or components and/or groups thereof

The invention claimed is:

1. A method, comprising:

determining that electricity supplied to a service site is restricted to power less than a threshold value;

determining the threshold value for limiting the restricted service, wherein determining the threshold value comprises:

obtaining an ambient temperature at the service site; and calculating the threshold value based at least in part on the ambient temperature;

determining if a consumption level at the service site exceeds the threshold value;

based on the consumption level exceeding the threshold value, and based on the electricity supplied to the service site being restricted, temporarily turning off electricity at the service site; and after a period of time, automatically reconnecting service to the service site.

2. The method of claim 1, additionally comprising:

waiting for a period of time;

reconnecting electricity to the service site;

measuring a second consumption level;

determining if the second consumption level exceeds the threshold value; and if the second consumption level exceeds the threshold value, then turning off electricity at the service site.

3. The method of claim 1, additionally comprising:

waiting for a period of time;

determining an update of the ambient temperature;

determining a second threshold value based at least in part on the update of the ambient temperature;

reconnecting electricity to the service site;

determining a second consumption level;

determining if the second consumption level exceeds the second threshold value; and if the second consumption level exceeds the second threshold value, then turning off electricity at the service site.

4. The method of claim 1, wherein:

the consumption level comprises:

a peak consumption level lasting less than a minute; and a sustained consumption level lasting over a minute; and the threshold value comprises:

a first value to be compared to the peak consumption level; and a second value to be compared to the sustained consumption level.

5. The method of claim 1, wherein determining the threshold value additionally comprises:

setting the threshold value based at least in part on time of day; and adjusting the threshold value at least once in a 24-hour period.

6. A method, comprising:

determining that electricity supplied to a service site is restricted to power less than a threshold value;

disaggregating the electricity supplied to the service site to recognize one or more appliances;

obtaining an ambient temperature at the service site;

calculating the threshold value based at least in part on the ambient temperature and to exclude operation of at least one recognized appliance;

determining if a consumption level at the service site exceeds the threshold value; and based on the consumption level exceeding the threshold value, and based on the electricity supplied to the service site being restricted, turning off electricity at the service site.

7. A method, comprising: of claim 1, determining that electricity supplied to a service site is restricted;

obtaining an ambient temperature at the service site;

calculating a threshold value based at least in part on the ambient temperature;

determining if a consumption level at the service site exceeds the threshold value; and based on the consumption level exceeding the threshold value, and based on the electricity supplied to the service site being restricted, turning off electricity at the service site based on actions comprising:

disaggregating the electricity supplied to the service site to recognize one or more appliances;

determining that an appliance from among the one or more appliances is not included in a listing of allowed appliances; and based on the determining, turning off electricity at the service site.

8. A network device for use in an electricity system, comprising:

a processor;

one or more memory devices in communication with the processor; and statements defined in the one or more memory devices and executable by the processor, wherein execution by the processor performs actions comprising:

determining that electricity supplied to a service site is restricted to power less than a threshold value;

determining the threshold value for limiting the restricted service, wherein determining the threshold value comprises:

obtaining an ambient temperature at the service site; and calculating the threshold value based at least in part on the ambient temperature;

determining if a consumption level at the service site exceeds the threshold value;

based on the consumption level exceeding the threshold value, and based on the electricity supplied to the service site being restricted, temporarily turning off electricity at the service site; and after a period of time, automatically reconnecting service to the service site.

9. The network device as recited in claim 8, wherein the networked device comprises:

an electricity meter; or a headend device.

10. The network device as recited in claim 8, wherein the actions additionally comprise:

waiting for a period of time;

reconnecting electricity to the service site;

measuring a second consumption level;

determining if the second consumption level exceeds the threshold value; and based on the second consumption level exceeding the threshold value, turning off electricity at the service site.

11. The network device as recited in claim 8, wherein the actions additionally comprise:

waiting for a period of time;

determining an update of the ambient temperature;

determining a second threshold value based at least in part on the update of the ambient temperature;

reconnecting electricity to the service site;

determining a second consumption level;

determining if the second consumption level exceeds the second threshold value; and if the second consumption level exceeds the second threshold value, then turning off electricity at the service site.

12. The network device as recited in claim 8, wherein the consumption level and the threshold value are each based at least in part on factors comprising:

a sustained consumption level; and a peak consumption level.

13. The network device as recited in claim 8, wherein determining the threshold value additionally comprises:

setting the threshold value based at least in part on time of day; and adjusting the threshold value at least once in a 24-hour period.

14. A network device for use in an electricity system, comprising:

a processor;

one or more memory devices in communication with the processor; and statements defined in the one or more memory devices and executable by the processor, wherein execution by the processor performs actions comprising:

determining that electricity supplied to a service site is restricted to power less than a threshold value;

disaggregating the electricity supplied to the service site to recognize one or more appliances;

obtaining an ambient temperature at the service site;

calculating the threshold value based at least in part on the ambient temperature and to exclude operation of at least one recognized appliance;

determining if a consumption level at the service site exceeds the threshold value; and based on the consumption level exceeding the threshold value, and based on the electricity supplied to the service site being restricted, turning off electricity at the service site.

15. A network device for use in an electricity system, comprising:

a processor;

one or more memory devices in communication with the processor; and statements defined in the one or more memory devices and executable by the processor, wherein execution by the processor performs actions comprising:

determining that electricity supplied to a service site is restricted to power less than a threshold value;

obtaining an ambient temperature at the service site;

calculating the threshold value based at least in part on the ambient temperature;

determining if a consumption level at the service site exceeds the threshold value; and based on the consumption level exceeding the threshold value, and based on the electricity supplied to the service site being restricted, turning off electricity at the service site based on actions comprising:

disaggregating the electricity supplied to the service site to recognize one or more appliances;

determining that an appliance from among the one or more appliances is not among a listing of allowed appliances; and based on the determining, turning off electricity at the service site.

16. One or more non-transitory computer-readable media storing computer-executable instructions that, when executed by one or more processors, configure a computing device to perform actions comprising:

determining that electricity supplied to a service site is restricted;

determining a threshold value for limiting the restricted service, wherein determining the threshold value comprises:

obtaining an ambient temperature at the service site; and calculating the threshold value based at least in part on the ambient temperature;

determining if a consumption level at the service site exceeds the threshold value;

based on the consumption level exceeding the threshold value, and based on the electricity supplied to the service site being restricted, temporarily turning off electricity at the service site; and after a period of time, reconnecting service to the site responsive to a resident-initiated reconnection attempt.

17. One or more non-transitory computer-readable media as recited in claim 16, additionally comprising:

waiting for a period of time;

reconnecting electricity to the service site;

measuring a second consumption level;

determining if the second consumption level exceeds the threshold value; and based on the second consumption level exceeding the threshold value, turning off electricity at the service site.

18. One or more non-transitory computer-readable media as recited in claim 16, additionally comprising:

waiting for a period of time;

determining an update of the ambient temperature;

determining a second threshold value based at least in part on the update of the ambient temperature;

reconnecting electricity to the service site;

determining a second consumption level;

determining if the second consumption level exceeds the second threshold value; and if the second consumption level exceeds the second threshold value, then turning off electricity at the service site.

19. One or more non-transitory computer-readable media storing computer-executable instructions that, when executed by one or more processors, configure a computing device to perform actions comprising:

determining that electricity supplied to a service site is restricted;

disaggregating the electricity supplied to the service site to recognize one or more appliances;

obtaining an ambient temperature at the service site;

calculating a threshold value based at least in part on the ambient temperature and to exclude operation of at least one recognized appliance;

determining if a consumption level at the service site exceeds the threshold value; and based on the consumption level exceeding the threshold value, and based on the electricity supplied to the service site being restricted, turning off electricity at the service site.

20. One or more non-transitory computer-readable media storing computer-executable instructions that, when executed by one or more processors, configure a computing device to perform actions comprising:

determining that electricity supplied to a service site is restricted to power less than a threshold value;

obtaining an ambient temperature at the service site;

basing the threshold value at least in part on the ambient temperature;

setting the threshold value to include only electrical loads for uses comprising:

heating a residence at the service site, wherein the heating is based on the ambient temperature;

charging cellular telephones used by residents of the residence; and operating domestic lighting at the residence;

determining if a consumption level at the service site exceeds the threshold value; and based on the consumption level exceeding the threshold value, and based on the electricity supplied to the service site being restricted, turning off electricity at the service site.

* * * * *